Oct. 28, 1952     E. A. STULLER     2,615,217
CHAIN TIGHTENER
Filed Feb. 9, 1950
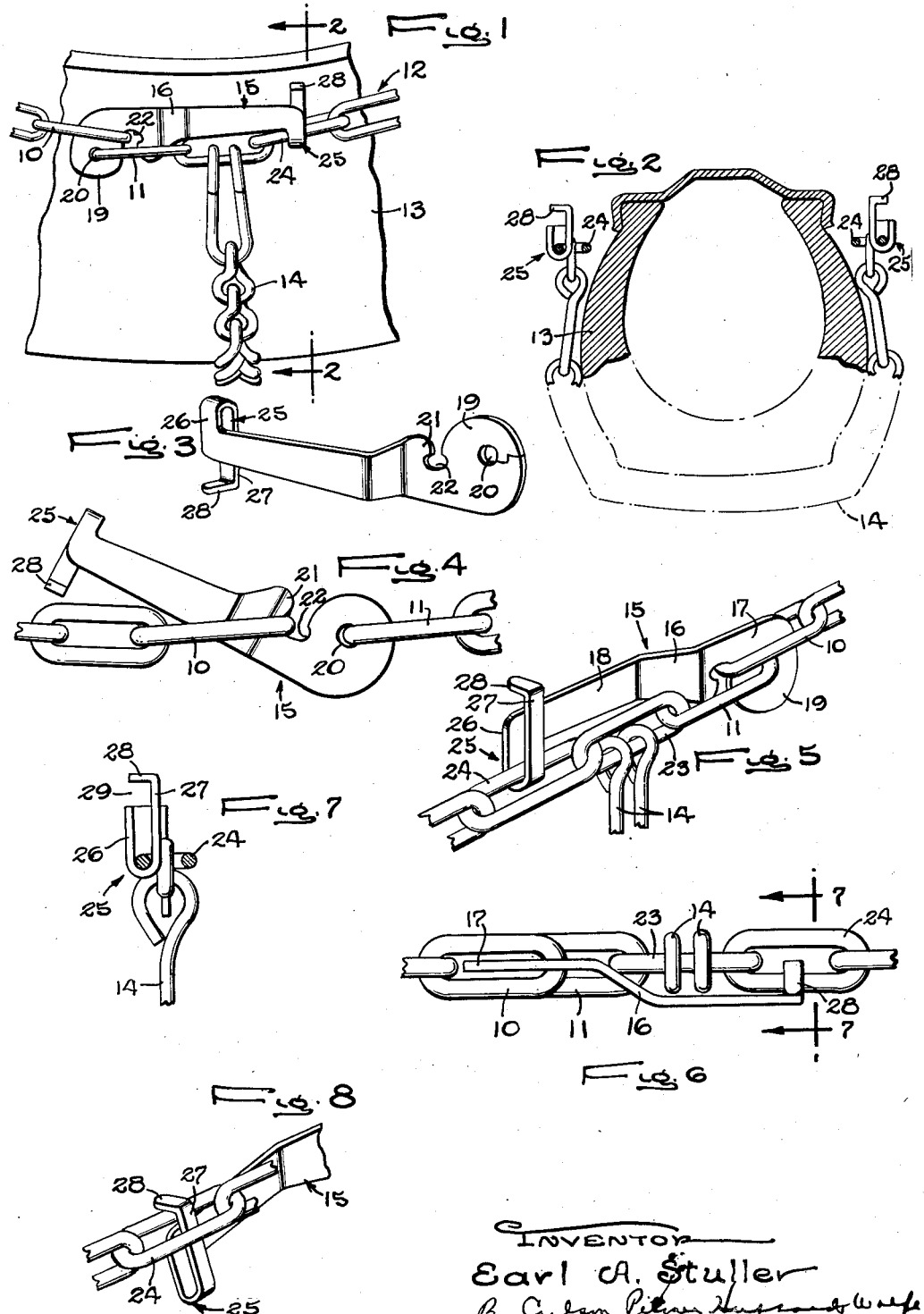
INVENTOR
Earl A. Stuller Patented Oct. 28, 1952

2,615,217

UNITED STATES PATENT OFFICE 2,615,217

CHAIN TIGHTENER

Earl A. Stuller, Dixon, Ill., assignor to Columbus McKinnon Chain Corporation, Tonawanda, N. Y., a corporation of New York Application February 9, 1950, Serial No. 143,177

4 Claims. (Cl. 24—69)

This invention relates to a chain tightener in the form of a lever or bar which is adapted at one end to hook around the tightened chain and hold the lever in tightened position.

One object is to provide a bar having a hook for the end of the bar which is constructed in a novel manner to preclude release of the tightener or disengagement thereof from the chain in the event of slackening of the latter.

The invention also resides in the novel construction of the bar and the hook from a single piece of sheet material.

Other objects and advantages of the invention will become apparent from the following detailed description taken in connection with the accompanying drawings, in which Figure 1 is a fragmentary elevational view of a tire equipped with a chain embodying the features of the present invention.

Fig. 2 is a section taken along the line 2—2 of Fig. 1.

Fig. 3 is a perspective view of the tightener.

Fig. 4 is an elevational view of the tightener mechanism partially closed.

Fig. 5 is a fragmentary perspective view of the chain and tightener.

Fig. 6 is a plan view of the chain and tightener in closed position.

Fig. 7 is a sectional view taken along the line 7—7 of Fig. 6.

Fig. 8 is a view similar to Fig. 5 showing the parts in different positions.

The improved fastening device shown for purposes of illustration is especially adapted for use in drawing together the terminal links 10 and 11 of a chain 12 to tension the latter around a tire 13 on an automotive vehicle. Two such chains extend along opposite sides of the tire and are connected by cross chains 14 spaced around the tire tread. Each side chain comprises a succession of elongated oval-shaped links of uniform length with each link interlocked with the adjacent links.

In this instance, the tightener is in the form of a lever 15 stamped from a flat bar of metal having a lateral bend 16 approximately midway between its ends to divide the bar into opposite substantially flat end portions 17 and 18 which are offset laterally from each other. Projecting from a longitudinal edge of the portion 17 and at the end thereof is a lug 19 having a hole 20 punched therein and receiving the end of one terminal link 11 of the chain. Adjacent the hole 20 is a second lug 21 which cooperates with the adjacent side of the lug 19 to form a tapered throat leading to a notch 22 adapted to receive the end of the terminal link 10 on the other end of the chain. This recess is offset from the hole edgewise of the bar so that after tightening of the chain, the two terminal links 10 and 11 will lie adjacent each other but in spaced planes and will, under the final chain tension, swing the bar in a direction to hold the latter in tightened position (see Fig. 5).

To permit the terminal link 10 to pass over the lug 21 and enter the notch 22, the end portion 18 of the bar is narrow enough to thread through this terminal link as shown in Fig. 4. When the bar has been moved into the tightened position shown in Fig. 5 by counterclockwise swinging of the bar, the end portion 18 projects beyond the second link 23 and to a point about midway between the ends of the third link 24. Reverse swinging of the bar under the tension of the chain is limited by engagement between one side of the third link 24 and the closed end of a U-shaped hook 25 rigid with the extreme free end of the bar portion 18 and opening edgewise from the bar in the direction in which the bar tends to swing under the tension. Herein, one leg 26 of the hook is formed by the end of the bar and an edgewise extension thereof which preferably is formed integral with the bar and is bent reversely to form the other leg 27 of the U. This leg extends parallel to the first leg and across the bar and is spaced from the latter far enough to enable one side of the chain link 24 to freely enter the hook opening and come to rest in the closed or bent end of the hook.

Under the tension normally placed on the chain in service, the lever 15 tends to swing in the direction of the hook opening thus maintaining the link 24 seated in the bottom of the hook 25 as shown in Fig. 5. The chain may, however, become slackened in service thus allowing the lever to swing reversely out of engagement with the link 24 which may not enter the hook properly when the chain is again tensioned thereby giving rise to the danger of the chain ends being released from each other.

The present invention aims to overcome the foregoing difficulty through a simple and inexpensive modification of the chain hook 25 without interfering with the normal operation of tightening the chain by swinging the lever 15. This is accomplished by the provision of a stop which overlies and projects across the open end of the hook 25 and acts to limit the extent of reverse swinging of the lever 15 but is spaced from the end of one of the hook legs far enough to enable the side of the link 24 to enter the hook properly in applying the chain to the tire. Herein, the stop takes the form of a right angular lug 28 bent from the extreme end portion of the hook leg 27 which is made long enough to form the lug and space the latter properly from the other leg of the hook sufficiently to form with the far edge of the bar 15 a laterally opening gap 29 (Fig. 7) substantially wider than the thickness of the chain wire.

With the hook 25 thus constructed, the initial interengagement of the chain link and the hook involves two motions, the first being a movement of the link side transversely of the lever to thread the lug 28 through the link or in other words pass the chain side through the gap 29 into the open end of the hook. The second motion is in the plane of the lever and reverse to the normal tightening movement thereof so as to move the link side to its limit position in the bottom of the hook.

Release of the link from the hook can be effected only by reversing these two motions, that is, by movement of the link side toward the open end of the hook and against the lug 28 followed by lateral movement out along the lug and through the gap 29. The first of the motions may occur accidentally under service conditions after slackening of the chain as described above but the second motion will not follow automatically. Instead the link side remains against the stop lug 28 as shown in Fig. 8 since the lever or chain will not, without manual assistance, readily move in a direction transversely of the lever even when the chain is slack. Thus, the chain link 24 remains positioned for proper reentry and movement to the bottom of the hook when the chain is again tensioned. The danger of the accidental release of the hook is thus avoided by the above described action of the stop 28 which may be formed simply and cheaply merely as an extension of one leg of the hook 25.

I claim as my invention:

1. A chain tightener comprising an elongated bar having an edgewise opening recess near one end receiving one link of a chain and an adjacent hole receiving another link of the chain, a U-shaped member having spaced generally parallel legs of different lengths adapted to receive a third link of the chain between them, the shorter leg of said member being formed integral with said bar and the longer leg of said member projecting transversely across said bar beyond one longitudinal edge thereof, and a lug integral with the extreme free end of said longer leg and projecting laterally therefrom across the opening of said U-shaped member at a point spaced a sufficient distance beyond said bar edge to permit said lug and said longer leg to be threaded through the third link of the chain.

2. A chain tightener comprising an elongated bar having an edgewise opening recess near one end receiving one link of a chain and an adjacent hole receiving another chain link, a U-shaped member rigid with said bar adjacent the other end thereof and adapted to receive a third link of the chain, said U-shaped member having a relatively short leg lying substantially in the plane of said bar and a relatively long leg projecting across said bar beyond one longitudinal edge thereof, and a projection on the end of said relatively long leg extending laterally across said opening of the U-shaped member at a point spaced beyond said bar edge a sufficient distance to permit said projection and said relatively long leg to be threaded through the third link of the chain.

3. A chain tightener of the character described comprising an elongated lever having a hole and an edgewise opening recess near one end adapted to receive the ends of terminal links of a chain to be tightened, said hole and recess being spaced apart longitudinally of said lever and offset from each other edgewise thereof, and a U-shaped hook rigid with the other end of said lever and opening in an edgewise direction to receive and retain a side of a third link of the chain after tightening of the latter by swinging of said lever, one leg of said hook projecting beyond an end of the other leg thereof, said one leg having a stop member rigid therewith and projecting across the open end of said hook and cooperating with said end of the other hook leg to form a gap through which the third link side may enter said hook, said hole and recess being offset in a direction causing tension in the chain to bias the third link side into said hook.

4. A chain tightener comprising a relatively flat elongate member having laterally offset portions, said member having an edgewise opening recess and a hole adjacent one end thereof adapted to receive the terminal links of a chain, said recess having a tapered throat portion and being offset from said hole edgewise of said member, a substantially U-shaped element adjacent the other end of said member and opening in an edgewise direction opposed to the opening of said recess to receive and retain a side of a third link of the chain when the chain is tightened, said U-shaped element comprising one leg lying substantially in the plane of the associated end of said member and a second leg generally parallel to said one leg and projecting therebeyond, and flange means on the free end of said second leg projecting across the open end of said U-shaped element in a plane spaced from the corresponding end of said one leg, whereby to form a laterally opening gap for the entrance of the third chain link into said U-shaped element and provide a stop means acting to retain the third chain link in said U-shaped element.

EARL A. STULLER.

REFERENCES CITED

The following references are of record in the file of this patent:

UNITED STATES PATENTS

| Number | Name | Date |
|---|---|---|
| 1,419,565 | Howg | June 13, 1922 |
| 1,689,827 | Gruner | Oct. 30, 1928 |

FOREIGN PATENTS

| Number | Country | Date |
|---|---|---|
| 442,298 | Great Britain | of 1936 |